Figure 1:
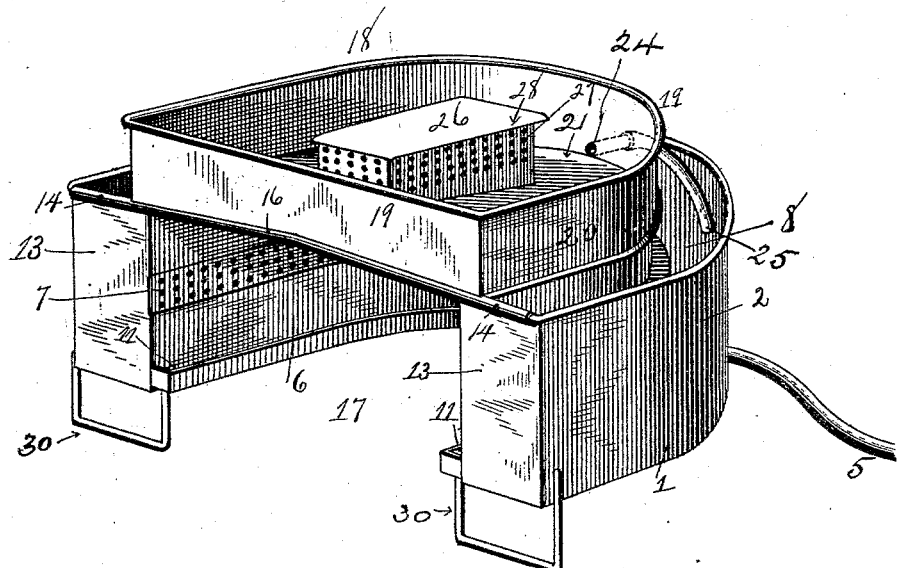

(No Model.)

E. B. MAGILL.
BODY COOLER.

No. 414,558. Patented Nov. 5, 1889.

Witnesses

Inventor
Edwin Belmont Magill
By his Attorney
Chas. J. Gooch

UNITED STATES PATENT OFFICE.

EDWIN BELMONT MAGILL, OF LA CROSSE, WISCONSIN.

BODY-COOLER.

SPECIFICATION forming part of Letters Patent No. 414,558, dated November 5, 1889.

Application filed June 6, 1888. Serial No. 276,223. (No model.)

*To all whom it may concern:*

Be it known that I, EDWIN BELMONT MAGILL, a citizen of the United States, residing at La Crosse, in the county of La Crosse and State of Wisconsin, have invented certain new and useful Improvements in Body-Coolers; and I do hereby declare the following to be a full, clear, and exact description of the invention, such as will enable others skilled in the art to which it appertains to make and use the same.

This invention relates to certain improvements in body-coolers.

The invention, as hereinafter described, consists of a novel construction of apparatus designed to contain ice or other cooling medium and furnish a supply of cold air to that portion of the body to which the apparatus is applied.
While in the drawings accompanying this specification I have shown my improved apparatus as especially constructed with a view to its application to a person's head, modifications in the shape or contour thereof will be readily apparent to those skilled in the art to adapt the invention for application to other portions of the body it may be desired to cool, the same general principles hereinafter described being, of course, maintained in all instances.

Figure 2:
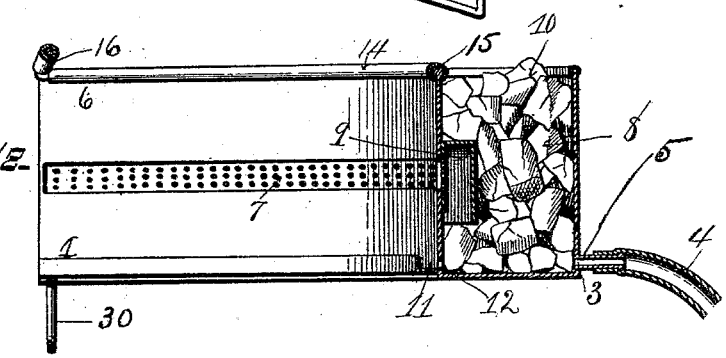
Figure 3:
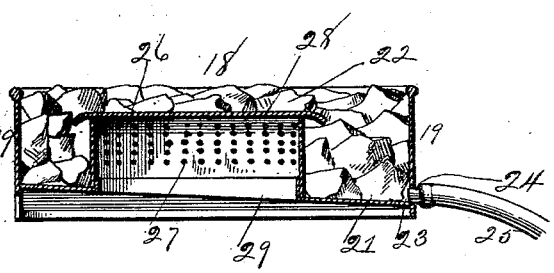

In the accompanying drawings, Figure 1 represents a perspective view of my complete apparatus as designed for application to the head for cooling the same. Fig. 2 represents a sectional elevation of the bottom portion of the apparatus. Fig. 3 represents a similar view of the top portion.

This apparatus is designed for use in cooling certain parts of the body, for the purpose of reducing inflammation and fevers, reducing the temperature, cooling corpses, and as a substitute for the application of and constant changing of wet cloths on persons, the apparatus being especially serviceable in cases of brain fever, wounds, spinal meningitis, and inflammation and fever generally.

1 represents the bottom portion of the apparatus, which in the form shown in the drawings is adapted for application to the head. In this construction the bottom section 1 is formed of semicircular shape to adapt it to fit around and encircle the base or rear and sides of the head. This bottom section is double-walled, as shown, the outer wall 2 being plane-faced and having one or more holes 3 in the bottom thereof, through which water resulting from condensation and the melting of the ice may discharge, such water being carried off away from the couch upon which the user may be by a tube or tubes 4, engaged with a short tube or pipe 5, extending outwardly from the opening 3.

6 represents the inner wall of the bottom section of the apparatus. This, as shown, is also of semicircular shape and has a circumferential series of perforations 7 therein, through which the cooled air passes from the ice-chamber 8, between the walls 2 and 6, to that part of the body to which the apparatus is applied.

9 represents a vertically-extending apron attached to the inner face of the inner wall 6, and within the ice-chamber, to insure the cooled air, after coming in contact with the ice 10 in the chamber 8, passing to the bottom thereof, and from thence up between said apron and the adjacent face of the inner wall to and through the perforations 7 to the body of the user.

11 represents a semi-circumferential gutter, extending outwardly from the bottom of the inner wall for the purpose of catching any moisture or water of condensation that may trickle down the inner wall, and 12 represents a discharge-opening communicating with the ice-chamber 8, through which such water may discharge.

13 represents the closed ends of the apparatus closing the ice-chamber.

14 represents rubber sheathing encircling the upper rims or beads 15 of the section and the rod 16. 16 represents a rod for bracing said section and assisting in the support of the top section, to be presently described. By thus covering the rims a cushion is provided upon which the upper section rests, and thereby all noise that would otherwise result from the contact or movement of the two sections, one against the other, is deadened. Such noise-deadening covering may also be placed upon or over such other exposed portions of the apparatus as would be liable to create noise upon coming in contact with other articles or with the other parts of the apparatus. This lower section 1 is designed to rest directly over that portion of the body to be cooled, the ice or other cooling medium 10 being placed within the chamber 8, which, as shown, is open at its top to admit air, which, under the ordinary and well-known natural laws, descends as it becomes cooled by contact with the ice, and, seeking an outlet, is by the pressure of the superincumbent body of cold air forced up to the only outlet available, viz: between the apron 9 and inner wall 6, to and through the perforations 7 in the wall 6, onto the body of the user. In the construction shown, which is the form especially adapted for use on the head, the central space 17, within which the head rests, is entirely open. As a consequence, were such lower section alone employed, the result would be that the cold air would be supplied simply around the base and sides of the head, while the crown of the head would not be subjected to cooling action.

The employment of a single section, as the bottom one, may in some cases be advantageous and all that is necessary, but where, as would usually be the case, it might be desired to confine the cold air in contact with that part of the body to which the apparatus is applied, I employ a top section or cap 18, of semi-cylindrical shape, with a front wall 19. This top section or cap rests in use upon the covered top rim 15 and rod 16 of the lower section, thereby covering the central space 17 and covering the crown of the head, or, as the case may be, the upper or exposed surface of that part of the body to which the apparatus is applied. The front wall 19 and side walls 20 of this top section are of sufficient height to form with the bottom 21 an ice-receiving chamber 22. The bottom 21 slopes gradually from the center to the outer walls, so as to permit of the water resulting from condensation and the melting of the ice flowing to and passing out through a discharge-opening 23 in the side wall. With this opening communicates a short outwardly-extending pipe 24, to which one end of a rubber or other tube 25 is attached, the other end of which rests within the ice-chamber 8 of the lower section 1, into which it discharges the water passing therethrough.

26 represents a central upwardly-extending portion of the bottom of the section or cap 18. The side and end walls of this portion 26 are at their upper portion perforated, as shown at 27, through which cold air passes from contact with the ice in the chamber 22 to the body of the user. The lower portion of the walls of this portion 26 are imperforate to prevent any water coming in contact with the user.

28 represents a cap or cover for the top of this portion 26, the edges of said cap extending horizontally beyond the side walls and being downturned, as shown, to afford a hand-grasp, whereby the section 18 may be transported and placed in and removed from position. A central opening 29 is formed in the bottom 21 of the section 18, which is guarded by the box and through which the cooled air passes from the perforated side walls of said portion 26 to the body of the user.

By the employment conjointly of the two sections 1 and 18, above described, the application of cooled air is effectively secured over the entire surface of that portion of the body to which the apparatus is applied.

This device can be, with but slight change in contour, equally well adapted for application to other parts of the human anatomy, it being simply necessary to construct the section 1 of either circular, square, or other shape to adapt it to conform to the contour of that portion of the body to which it is to be applied, and when such part is desired to be employed similarly shaping the section 18, the general operative arrangement and construction of parts being in all cases, as above described, in relation to the form of apparatus designed for application to the head.

30 represents depending rectangular portions which serve as rests and supports to the cooler, whereby the same is supported at an angle to insure the discharge of the water resulting from the melting of the ice.

What I claim is—

1. A body-cooling device consisting of a tray constituting an ice-receiving chamber, a portion of the wall of which is provided with a series of air-passages and an air-deflecting apron extending across the air-passages, and a cap or cover adapted to rest upon said tray and to receive ice and having a raised central portion having perforated walls, substantially as and for the purpose set forth.

2. The body-cooler herein described, consisting of an ice-chamber having a water-exit, and perforations in the wall of said chamber, said perforations forming air-passages, an apron extending from one face of and within the ice-chamber for the purpose of guarding the air-passages, a water-receiving gutter extending along the exterior of the perforated side wall of the ice-chamber, and also having a discharge-passage communicating with the ice-chamber.

3. A body-cooler consisting of a curved ice-chamber forming the lower section thereof and having a perforated wall, a vertical apron guarding said perforations, and a waste-discharge, a second ice-receptacle adapted to rest upon said lower section and having a central upwardly-extending portion in the bottom thereof, with perforated side walls to permit of cold-air currents passing from said second receptacle to the space partially surrounded by the curved lower section, substantially as and for the purpose set forth.

In testimony whereof I affix my signature in presence of two witnesses.

EDWIN BELMONT MAGILL.

Witnesses:
W. B. TSCHARNER,
EMMA OEHLER.